(12) United States Patent
Selig

(10) Patent No.: US 9,684,781 B2
(45) Date of Patent: Jun. 20, 2017

(54) DETERMINE AUTHORIZATION OF A SOFTWARE PRODUCT BASED ON A FIRST AND SECOND AUTHORIZATION ITEM

(75) Inventor: Calvin L. Selig, Fort Collins, CO (US)

(73) Assignee: Hewlett Packard Enterprise Development LP, Houston, TX (US)

(*) Notice: Subject to any disclaimer, the term of this patent is extended or adjusted under 35 U.S.C. 154(b) by 296 days.

(21) Appl. No.: 13/824,517

(22) PCT Filed: Nov. 12, 2010

(86) PCT No.: PCT/US2010/056445
§ 371 (c)(1),
(2), (4) Date: Mar. 18, 2013

(87) PCT Pub. No.: WO2012/064331
PCT Pub. Date: May 18, 2012

(65) Prior Publication Data
US 2013/0219190 A1   Aug. 22, 2013

(51) Int. Cl.
*G06F 12/14* (2006.01)
*G06F 21/10* (2013.01)
*G06F 21/44* (2013.01)
*G06F 21/12* (2013.01)
*H04L 29/06* (2006.01)

(52) U.S. Cl.
CPC ............ *G06F 21/44* (2013.01); *G06F 21/121* (2013.01); *H04L 63/108* (2013.01); *H04L 63/0428* (2013.01); *H04L 2463/101* (2013.01)

(58) Field of Classification Search
CPC .... G06F 21/602; G06F 12/1408; G06F 21/64; G06F 21/10; G06F 21/60; G06F 21/52
See application file for complete search history.

(56) References Cited

U.S. PATENT DOCUMENTS

| | | | | |
|---|---|---|---|---|
| 6,067,622 | A * | 5/2000 | Moore | G06F 21/121 380/45 |
| 6,243,692 | B1 * | 6/2001 | Floyd et al. | 705/59 |
| 6,854,061 | B2 | 2/2005 | Cooper et al. | |
| 6,889,212 | B1 * | 5/2005 | Wang et al. | 705/59 |
| 6,978,374 | B1 * | 12/2005 | Hansen | G06F 21/71 713/183 |
| 7,331,063 | B2 * | 2/2008 | Gunyakti et al. | 726/30 |

(Continued)

FOREIGN PATENT DOCUMENTS

| | | |
|---|---|---|
| EP | 0679980 | 11/1995 |
| EP | 2068565 | 6/2009 |

(Continued)

OTHER PUBLICATIONS

European Patent Office, Extended Search Report for EP 10859444.1 dated Oct. 10, 2014 (6 pages).

(Continued)

*Primary Examiner* — Fotoumata Traore

(57) ABSTRACT

Embodiments disclosed herein relate to determining authorization of a software product based on a first authorization item and a second authorization item. Each authorization item may be a file or a registry key. A processor 104 may determine whether use of the software product is authorized at a particular time period by comparing a first authorization item and a second authorization item.

18 Claims, 11 Drawing Sheets

(56) References Cited

U.S. PATENT DOCUMENTS

| | | | |
|---|---|---|---|
| 7,925,751 B1* | 4/2011 | Bolinger et al. | 709/225 |
| 8,775,797 B2* | 7/2014 | Layson et al. | 713/156 |
| 9,355,224 B1* | 5/2016 | Le Hir | G06F 21/105 |
| 2003/0110375 A1 | 6/2003 | Colvin | |
| 2004/0025033 A1 | 2/2004 | Todd | |
| 2007/0027767 A1 | 2/2007 | Akagane | |
| 2007/0130073 A1 | 6/2007 | Celli et al. | |
| 2008/0319779 A1* | 12/2008 | Hughes | G06Q 30/06 705/310 |
| 2009/0253414 A1 | 10/2009 | Gosselin et al. | |
| 2009/0327091 A1 | 12/2009 | Hartin et al. | |
| 2012/0117661 A1* | 5/2012 | Kao | 726/28 |

FOREIGN PATENT DOCUMENTS

| | | |
|---|---|---|
| FR | 2779543 | 12/1999 |
| JP | 2002006970 A | 1/2002 |
| JP | 2002056128 A | 2/2002 |

OTHER PUBLICATIONS

European Patent Office, Communication pursuant to Rules 70(2) and 70a(2) EPC for EP Application No. 10859444.1 dated Oct. 28, 2014 (1 page).

HP Skyroom, HP Skyroom Frequently Asked Questions dated Sep. 2009 (6 pages).

Korean Intellectual Property Office, PCT Notification of Transmittal of the International Search Report and the Written Opinion of the International Searching Authority, or the Declaration for PCT/US2010/056445 dated Aug. 2, 2011 (9 pages).

The International Bureau of WIPO, International Preliminary Report on Patentability for PCT/US2010/056445 dated May 14, 2013 (5 pages).

www.mydigitallife.info—Extend or Reset Trial Period of Trial Demo Software dated as early as Oct. 28, 2010 (8 pages).

* cited by examiner

DETERMINE AUTHORIZATION OF A SOFTWARE PRODUCT BASED ON A FIRST AND SECOND AUTHORIZATION ITEM

CROSS-REFERENCE TO RELATED APPLICATION

This application is a national stage application under 35 U.S.C. §371 of PCT/US2010/056445, filed Nov. 12, 2010.

BACKGROUND

A software product may be authorized for a particular time period. For example, a user may be granted use of a software product for a trial period, such as for thirty days. The trial period may be provided free or at a lower cost than full use of the software product to familiarize a user with the software product. The introductory trial period may then encourage the user to pay for continued use of the software product at the end of the trial period.

BRIEF DESCRIPTION OF THE DRAWINGS

In the accompanying drawings, like numerals refer to like components or blocks. The drawings show example implementations. Some of the drawings describe method steps occurring in an example order, but the method steps may be performed in any order. The following detailed description references the drawings, wherein.

DETAILED DESCRIPTION

A software product may be authorized for a particular period of time. For example, a software vendor may provide a user authorization to use a software product on a trial basis, such as for thirty days or until a particular day. The trial may be limited in time, such as because it is free or cheaper than the regular price of the software product.

Limiting the use of a software product to a particular time period may involve having a user enter an authorization code. However, in some cases a user may share the authorization code or may change the authorization code to extend the amount of authorized use. In some cases, authorization information related to a trial period may be retrieved from a remote device. For example, a software product may include instructions to check a remote database via a network to check whether use of the software product is authorized. However, in some cases it may be desirable for the authorization information to be stored locally on the electronic device executing the software product. A software product may create an authorization file stored locally on the electronic device such as when the software product is installed. A user may discover the file and attempt to extend a period of authorized use of a software product, such as by deleting or altering the file.

In one embodiment, authorization of a software product is enforced by creating two authorization items stored on the electronic device running the software product where each authorization item is created at a different time. For example, one authorization item may be created when the software product is installed and another authorization item may be created when the software product is executed for the first time. The authorization items may be separate items. For example, one authorization item may be a file and the other may be a registry key, or the authorization items may be separate files or registry keys. The two authorization items may be coordinated such that an inconsistency between them may indicate that use of the software product is unauthorized.

Using two authorization items created at different times may make it more difficult for a user to discover the two authorization items. If a user discovers one of the authorization items and alters or deletes it, the tampering may be evident because of a resulting inconsistency between two authorization items. As a result, it may be more difficult for a user to extend an authorization period for a software product.

Figure 1:
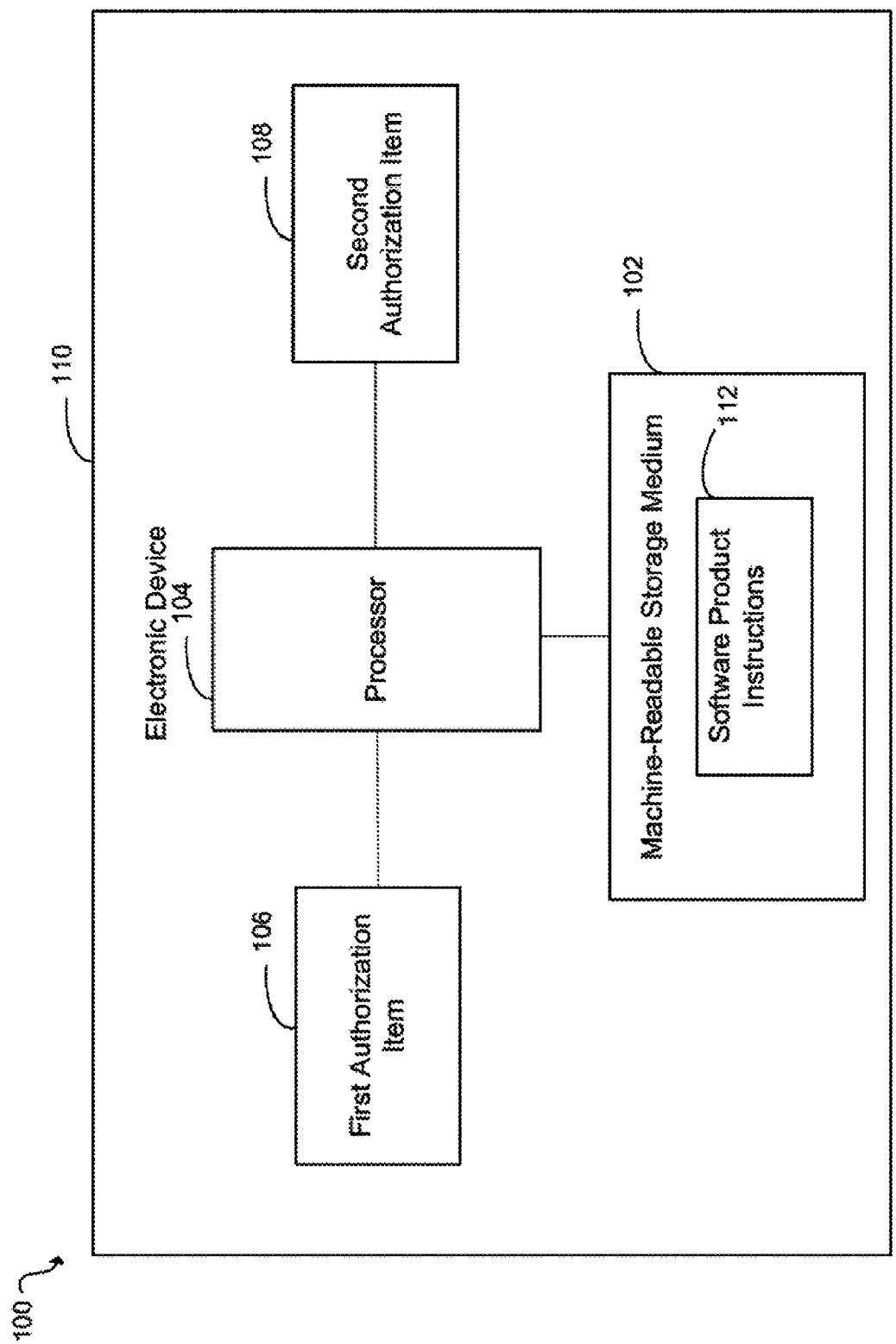
FIG. 1 is a block diagram illustrating one example of a computing system.

FIG. 1 is a block diagram illustrating one example of a computing system 100. The computing system 100 may include an electronic device 110. The electronic device 110 may be any suitable electronic device, such as a personal computer or mobile phone. The electronic device 110 may include, for example, a processor 104, a machine-readable storage medium 102, a first authorization item 106, and a second authorization item 108.

The processor 104 may be any suitable processor, such as a central processing unit (CPU), a semiconductor-based microprocessor, or any other device suitable for retrieval and execution of instructions, in one embodiment, the computing system 100 includes logic instead of or in addition to the processor 104. As an alternative or in addition to fetching, decoding, and executing instructions, the processor 104 may include one or more integrated circuits (ICs) or other electronic circuits that comprise a plurality of electronic components for performing the functionality described below. In one implementation, the computing system 100 includes multiple processors. For example, one processor may perform some functionality and another processor may perform other functionality.

In one implementation, the processor 104 executes instructions stored in a machine-readable storage medium 102. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium. The machine-readable storage 102 medium may include instructions executable by the processor 104.

The machine-readable storage medium 102 may include instructions associated with a software product 112. The software product 112 may be any suitable software product. The software product 112 may be authorized to execute on the processor 104 during a particular time period, such as a sixty day trial period.

The first authorization item 106 and the second authorization item 108 may be any suitable items for indicating whether use of the software product 112 is authorized. For example, the first authorization item 106 and the second authorization item 108 may be a file or a registry key. The first authorization item 106 and the second authorization item 108 may include information indicating a time period of authorized use of the software product. The first authorization item 106 and the second authorization item 108 may include it indicating properties of the other authorization item. For example, the first authorization item 106 may include information indicating whether the second authorization item 108 had been created.

The software product 112 may include instructions related to controlling whether the software product 112 may be executed on the processor 104 at a particular time. For example, the software product 112 may include instructions to generate a first authorization token, such as the first authorization item 106, when the software product 112 is installed and instructions generate a second authorization token, such as the second authorization item 108, when the software product 112 is run for the first time, where each authorization item is a file stored in a storage or a registry key stored in a registry. The software product 112 may include instructions to determine whether use of the software product 112 is authorized at a particular time based on a comparison of the first authorization item 106 and the second authorization item 108 and to prohibit use of the software product 112 if determined that use of the software product 112 is not authorized.

Figure 2A:
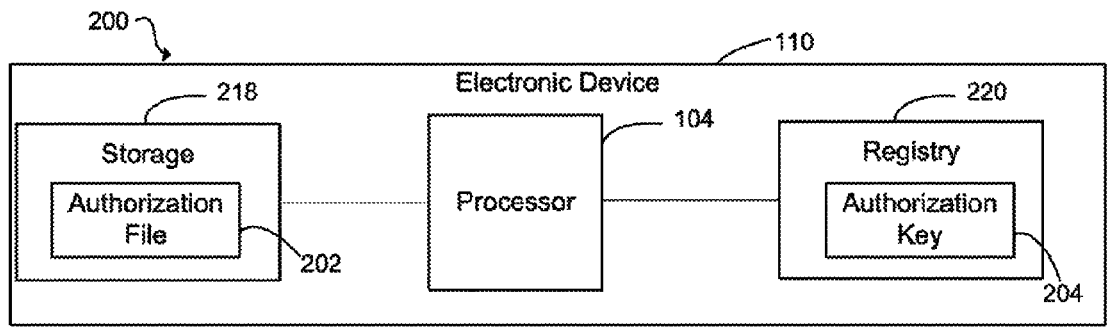
FIG. 2A is a block diagram illustrating one example of a computing system.
Figure 2B:
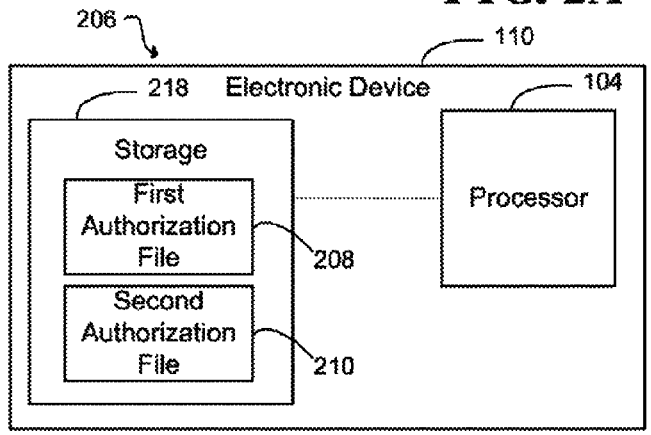
FIG. 2B is a block diagram illustrating one example of a computing system.
Figure 2C:
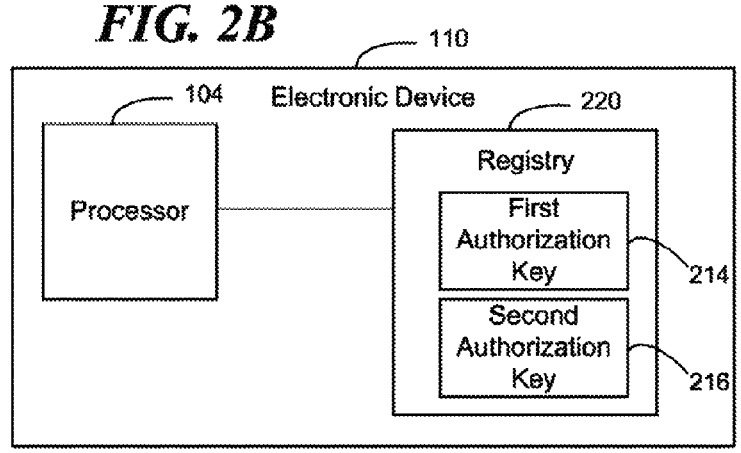
FIG. 2C block diagram illustrating one example of computing system.

FIGS. 2A, 2B, and 2C show example combinations of first authorization item and a second authorization item where each of the two authorization items may be either a registry key or a file. FIG. 2A is a block diagram illustrating one example of a computing system 200. The computing system 200 shows a first authorization item as an authorization file 202 stored in a storage 218 and a second authorization item as an authorization key 204 stored in a registry 220. The storage 218 may be any suitable storage, such as a hard disk drive or a flash drive. The storage 218 may store a file for storing information related to authorizing a software product. The registry 220 may be any suitable registry, such as a database storing settings related to an operating system. The registry 220 may include a registry key with properties related to authorizing a software product. The processor 104 may create one of the authorization items when the software product 112 is installed and the other authorization item during the first execution of the software product 112. FIG. 2B is a block diagram illustrating one example of a computing system 206. The computing system 206 includes a first authorization file 208 and a second authorization file 210. FIG. 2G is a block diagram illustrating one example of a computing system 212. The computing system 212 includes a first authorization key 214 and a second authorization key 216.

Figure 3:
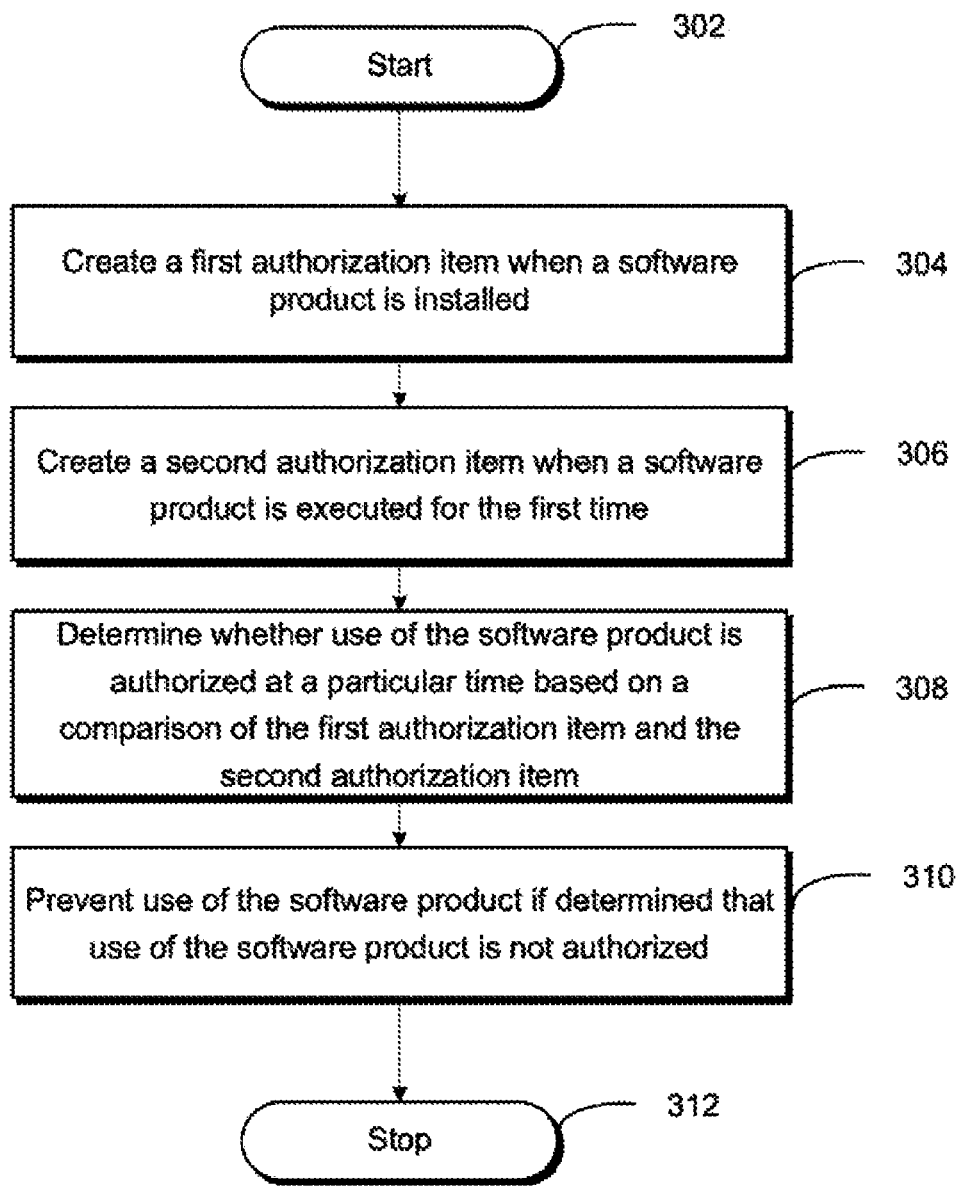
FIG. 3 is a flow chart illustrating one example of a method to determine authorization of a software product based on a first and second authorization item.

FIG. 3 is a flow chart illustrating one example of a method 300 to determine authorization of the software 112 product based on a first and second authorization item, such as the first authorization item 106 and the second authorization item 108. For example, a first authorization item may be created when the software product 112 is installed and a second authorization item may be created when the software product 112 is executed for the first time. Information may be stored in the first authorization item and the second authorization item related to the time period of authorized use of the software product 112. The information in the first authorization item and the second authorization item may be compared to a current date or date and time to determine whether the authorization period has expired in some cases, the information in the first authorization item and the second authorization may be compared to one another to determine if either authorization item has been tampered with.

Beginning at 302 and moving to 304, the processor 104, such as by executing instructions stored in the machine-readable storage medium 102, creates a first authorization item when the software product 112 is installed. For example, the software product 112 may include instructions for installation that include instructions to generate an authorization token. The first authorization item may be, for example, an authorization file or an authorization key.

The authorization item may be created in any suitable manner. The processor 104 may write information to the authorization item when it is created, such as by updating an authorization key property or storing information in an authorization file. For example, the processor 104 may include information about the install date or install time, such as by receiving or retrieving information about the current date from a system or Internet dock when the installation occurs. The information may include an expiration date calculated based on the installation date, such as an expiration date ninety days from the installation. The information may include identifying information that may be used to detect tampering with the authorization item. For example, if a user creates a new authorization item without the identifying information, the processor 104 may recognize that the authorization item was created by a user and not during the installation of the software product 112. The processor 104 may store the authorization item. The authorization item may be stored in a particular location or with a particular name. For example, the software product 112 may include instructions for where to store the authorization item, such as a file path or a registry key name.

Continuing to 306, the processor 104, such as by executing instructions stored in the machine-readable storage medium 102, creates a second authorization item when the software product 112 is executed for the first time. The second authorization item may be for example, an authorization file or an authorization key. The second authorization item may be the same type or a different type of item than the first authorization item. For example, both the first authorization item and the second authorization item may be a file or a registry key, or one of the first authorization item and the second authorization item may be a file and the other may be a registry key.

The second authorization item may be created in any suitable manner. The second authorization item may be stored in any suitable location. In one embodiment, information is included in the second authorization item, such as the date or time that the software product 112 was executed for the first time. The second authorization item may include an expiration date calculated based on the first execution, such as an expiration date thirty days from the first execution. In one embodiment, the processor 104 determines whether to create the second authorization term. For example, the processor 104 may analyze the first authorization item to determine whether the current execution of the software product 112 is the first execution of the software product 112.

In one implementation, information about the second authorization item is stored in the first authorization item. For example, information about the date of the first execution of the software may be stored in both the first and second authorization item. The processor 104 may retrieve information from the first authorization item to write to the second authorization item. For example, the install date or an expiration date related to the install date may be read from the first authorization item and stored in the second authorization item.

Moving to 308, the processor 104, such as by executing instructions stored in the machine-readable storage medium 102, determines whether use of the software product 112 is authorized at a particular time, such as at a particular date or date and time, based on a comparison of the first authorization item and the second authorization item. For example, a user may attempt to execute the software product 112, and the processor 104 may determine whether use of the software product 112 is authorized at that time. The processor 104 may compare the first authorization item and the second authorization item in any suitable manner. For example, the processor 104 may compare a current date to an expiration date, such as an expiration date in the first authorization item and the second authorization item or an expiration date calculated by adding a time period to an installation date or first execution date in the first authorization item and the second authorization item. The expiration date may be compared to a current date retrieved from an Internet clock to prevent a user from extending, the authorization period by changing the system dock on the electronic device 110. In one implementation, the processor compares a number of times that the software product 112 has executed. For example, each of the authorization items may include a number indicating the number of times the software product 112 has executed. The number may be compared to a maximum number of allowed times.

In one embodiment, the processor 104 compares the information in the first authorization item and the second authorization item to confirm that the information in the authorization items is consistent. For example, if the authorization items include different first execution dates, installation dates, or expiration dates, it may indicate that a user tampered with one of the authorization items by changing one of the authorization items or by deleting and recreating one of the authorization items.

Proceeding to 310, the processor 104, such as by executing instructions stored in the machine-readable storage medium 102, prevents use of the software product 112 if determined that use of the software product 112 is not authorized. The processor 104 may prohibit use of the software product 112 in any suitable manner. For example, the processor 104 may stop executing instructions related to the software product 112. If determined that use of the software product 112 is authorized, the processor 104 may continue to execute instructions associated with the software product 112 to allow the user to use the software product 112. The method 300 proceeds to 312 and ends.

Figure 4:
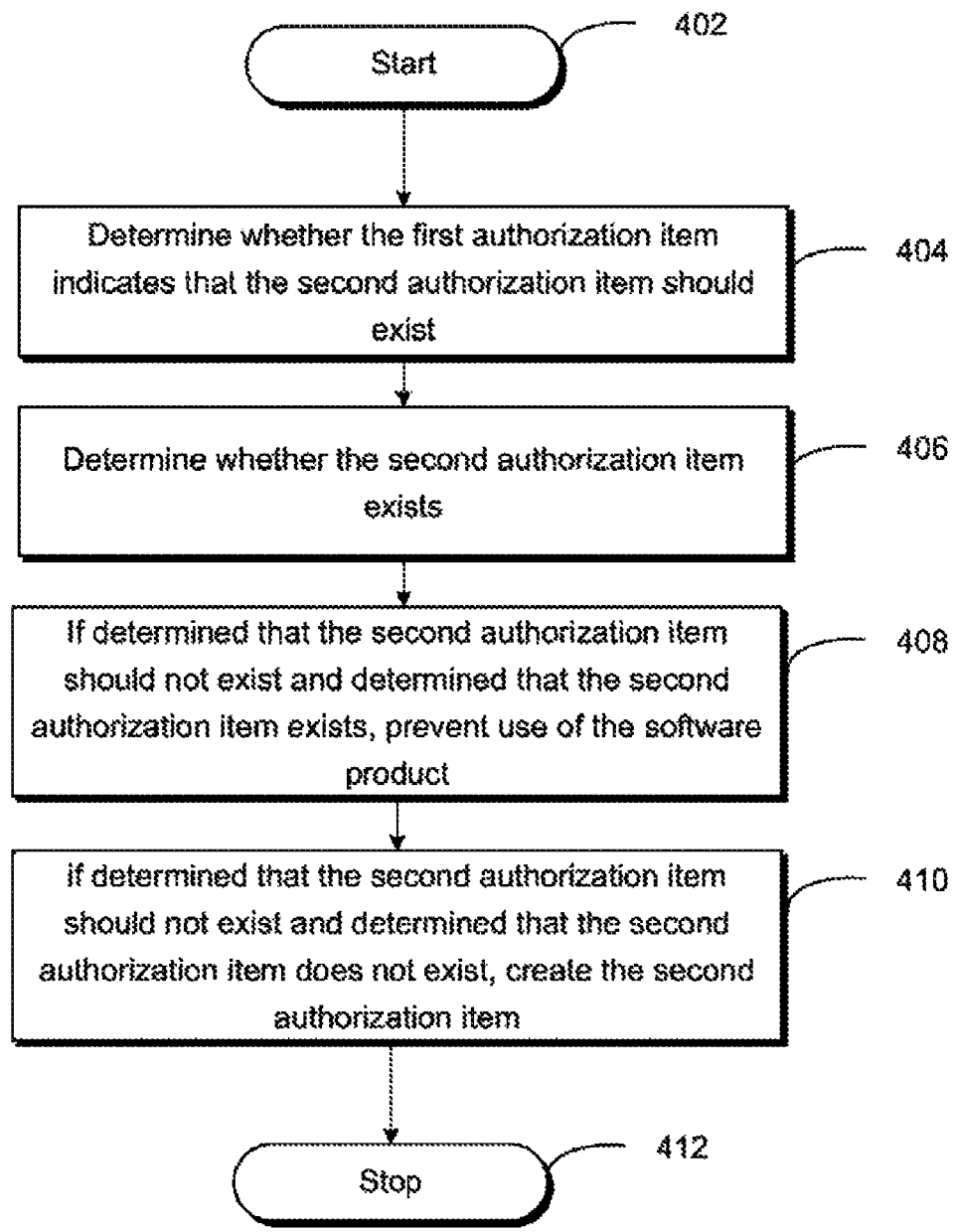
FIG. 4 is a flow chart illustrating one example of a method to create a second authorization item.

FIG. 4 is a flow chart illustrating one example of a method corresponding to 306 of FIG. 3 to create the second authorization item. For example, the processor 104 may determine whether the second authorization item should be created based on information in the first authorization item. The processor 104 may determine if a user has tampered with the authorization items. For example, if the second item exist and the first authorization item indicates that the second item should not exist, the use of the software product 112 may be prevented. The user may incorrectly believe that one authorization item controls the authorization of the software product 112. Checking to determine whether the second authorization item should be created may prevent a user from being able to circumvent the system by deleting the second authorization item.

Beginning at 402 and moving to 404, the processor 104 determines whether the first authorization item indicates that the second authorization item should exist. The processor 104 may retrieve the first authorization item. For example, the processor 104 may retrieve the first authorization item from the storage 218 or from the registry 220. The processor 104 may retrieve the first authorization item by using the file path or the registry key name. This may be done, for example, in response to executing the software product 112.

The first authorization item may include any suitable indication as to whether the second authorization item has been created. For example, the first authorization item may be created at install time without additional information that may be added when the second authorization item is created, or information from the first authorization item may be removed when the second authorization item is created. The processor 104 may check the first authorization item to see if it contains information or an absence of information that indicates that the second authorization term had been previously created. In one embodiment, the processor writes known values to the first authorization item when it is created, and the processor checks for these known values to verify that the file or registry key being analyzed is the first authorization item. A first execution date indicating when the second authorization item is created may be stored in the first authorization item. If a first execution date is not included in the first authorization item, the processor 104 may determine that the second authorization item had not been created.

In some cases, the processor 104 may leave the first authorization item and the second authorization item without deleting them when the software product 112 is uninstalled. This may prevent a user from circumventing the trial period by uninstalling and reinstalling the software product 112. For example, if the software is reinstalled, the first authorization item may still be available and indicating that the second authorization item was already created.

Continuing to 406, the processor 104 determines whether the second authorization item exists. For example, the processor 104 may check the storage 218 or the registry 220 to determine if the second authorization item exists. The processor 104 may know to check a particular location, such as a particular file path or registry key name. The steps of the method 400 may be performed in any order. For example, in some cases, the processor 104 may check whether the second authorization item exists prior to analyzing the first authorization item to determine whether the second authorization item should exist.

Proceeding to 408, if determined that the second authorization item should not exist and determined that the second authorization item exists, the processor 104 prevents use of the software product 112. For example, if the first authorization item indicates that the second authorization has not been created, but the second authorization item exists, it may indicate that a user altered or deleted the first authorization item without deleting the second authorization item. Use of the software product 112 may be prevented in any suitable manner.

If the first authorization item indicates that the second authorization item has not been created and the second authorization item does not exist, the processor 104 may create the second authorization item. For example, it may be the first time that the software product 112 is executed. The method 400 proceeds to 410 to end.

Figure 5:
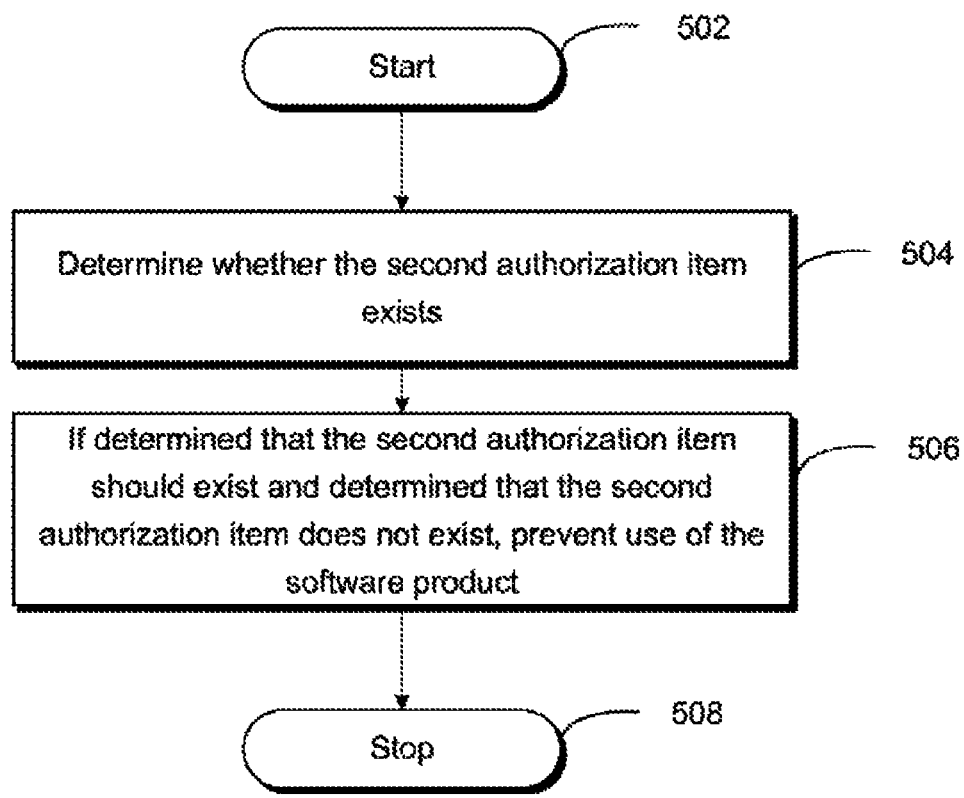
FIG. 5 is a flow chart illustrating one example of a method to compare a first authorization item and a second authorization item.

FIG. 5 is a flow chart illustrating one example of a method corresponding to 308 of FIG. 3 to compare a first authorization item and a second authorization item. When comparing the first authorization and the second authorization item to determine whether to allow use of the software product 112, the processor 104 may determine that the second authorization item does not exist even though the first authorization item indicates that the second authorization item has been created. If the second authorization item does not exist when it was previously created, the processor 104 may prevent use of the software product 112. The second authorization item may no longer exist, for example, because a user deleted it, such as in an attempt to extend the trial period. A comparison to determine whether the second authorization item exists where the first authorization item indicates that the second authorization item has been created may be done at any point. For example, the comparison may be done at the time when the processor 104 is determining whether the second authorization item should be created.

Beginning at 502 and moving to 504, the processor 104 determines whether the second authorization item exists. For example the processor 104 may attempt to access the second authorization item at a particular file path or registry key name to determine if the second authorization item exists.

Proceeding to 506, if determined that the second authorization item should exist and determined that the second authorization item does not exist, the processor 104 prevents use of the software product 112. If the second authorization item was created and now no longer exists, it may indicate that the second authorization item was deleted. The processor 104 may not recreate the second authorization item because creating it a subsequent time may a user to extend the authorization period. If determined that the second authorization item should exist and does exist, the processor 104 may compare the first authorization item and the second authorization item to determine whether use of the software product 112 should be allowed or prevented. The method 500 continues to 508 to end.

Figure 6:
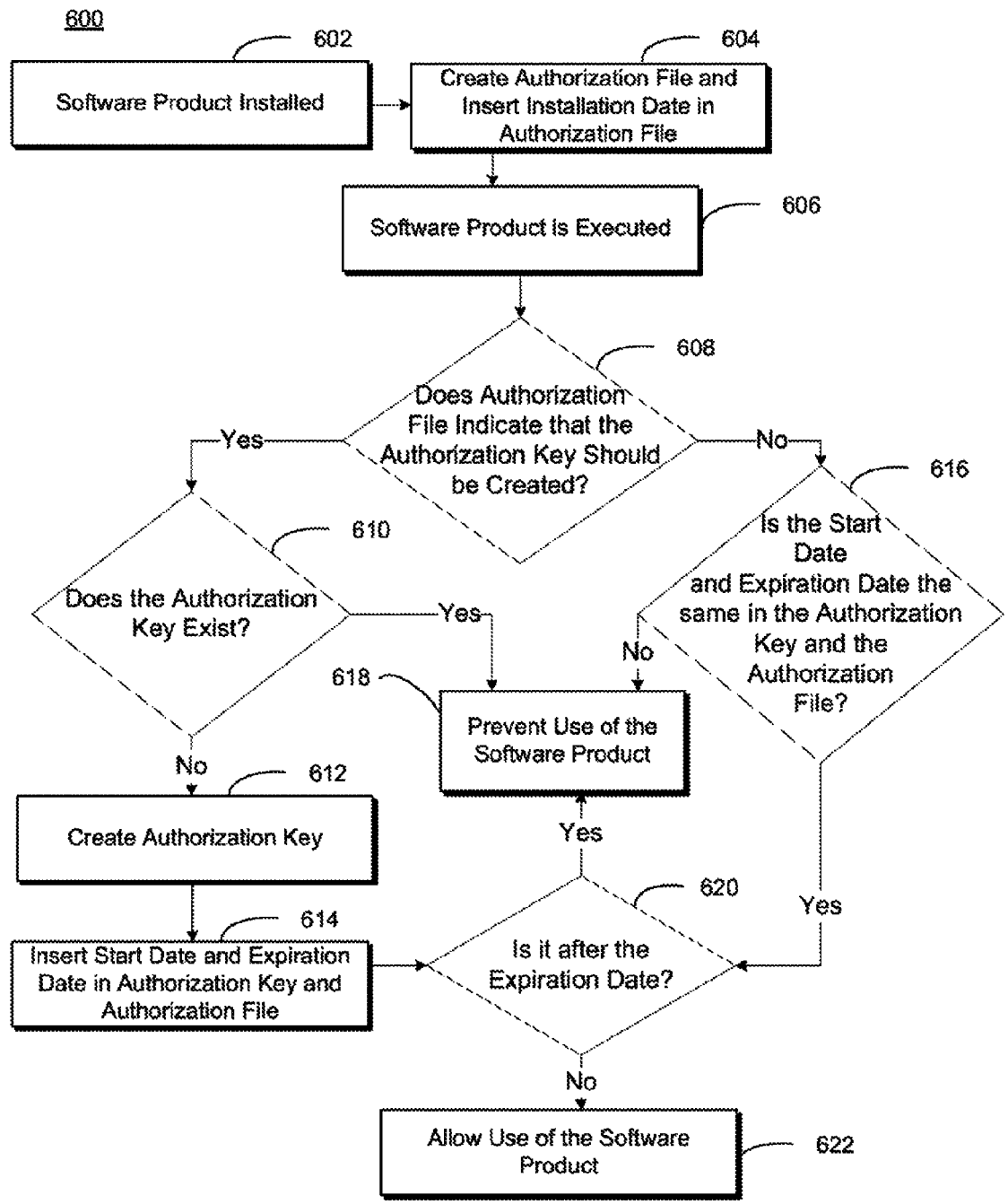
FIG. 6 is a flow chart illustrating one example of determining whether use of a software product is authorized.

FIG. 6 is a flow chart illustrating one example 600 of determining whether use of a software product is authorized. Beginning at 602, a software product is installed on an electronic device. The installation process may include, for example, storing instructions related to the software product in a machine-readable storage medium on the electronic device. Moving to 604, a first authorization item, such as an authorization file, may be created and stored during the installation process. In some cases, an expiration date may be inserted in the authorization file. For example, the trial period may be a particular number of days after installation of the software product, and the expiration date may be calculated by determining the current date, such as by using a system clock or internet clock, and adding the number of trial period days to it.

Continuing to 606, a user executes the software product to use it. Proceeding to 608, a processor determines whether the authorization file, the first authorization item, indicates that a second authorization item, such as an authorization registry key, should be created. The processor may check for known values written to the authorization file during install time to verify that the file being analyzed is the authorization file. The processor may check the authorization file for the presence or absence of information that indicates whether the authorization key has been created. For example, the processor may check to see if the authorization file includes a date that the authorization key was created.

Moving to 610, if determined that the authorization file indicates that the authorization key has not been created, the processor checks to see if the authorization key exists. If the authorization key exists, it may indicate that the authorization file was recreated, such as by deleting it and reinstalling the software without deleting the authorization key. The process may continue to 618 to prevent use of the software product if the authorization key exists.

Proceeding to 612, an authorization key is created if determined that it did not already exist. Continuing to 614, a first start date of the software product may be determined by retrieving the current date or time from the system clock or from an internet clock. The start date may be written to the authorization file and the authorization key. The start date may be written to both the authorization items so that the start date may be compared later to detect if either authorization item was deleted or altered. In one embodiment, an expiration date of the software product trial is calculated based on a time period from the start date, such as thirty days from the start date. If the expiration date was determined based on the install date of the software product, the processor may determine whether the current date is beyond the expiration date. For example, referring to 620, the processor may allow use of the software product if the expiration has not passed and may prevent use of the software product if the current date is after the expiration date.

Referring back to 608, the processor may evaluate the authorization file and determine that the authorization key had been created. Moving to 616, the processor may determine whether the start date and expiration date are the same in the authorization file and the authorization key. If when attempting to evaluate the authorization key it is determined that it does not exist, the processor may prevent use of the software product. If the authorization key does exist but the start date and expiration date are inconsistent between the authorization file and the authorization file, the processor may prevent use of the software product.

Proceeding to 620, the processor may determine whether the current date is after the expiration date. If so, moving to 620, use of the software product is prevented. If not, moving to 622, use of the software product is allowed. Each time that the software product is executed, the process continues starting at 606.

Figure 7:
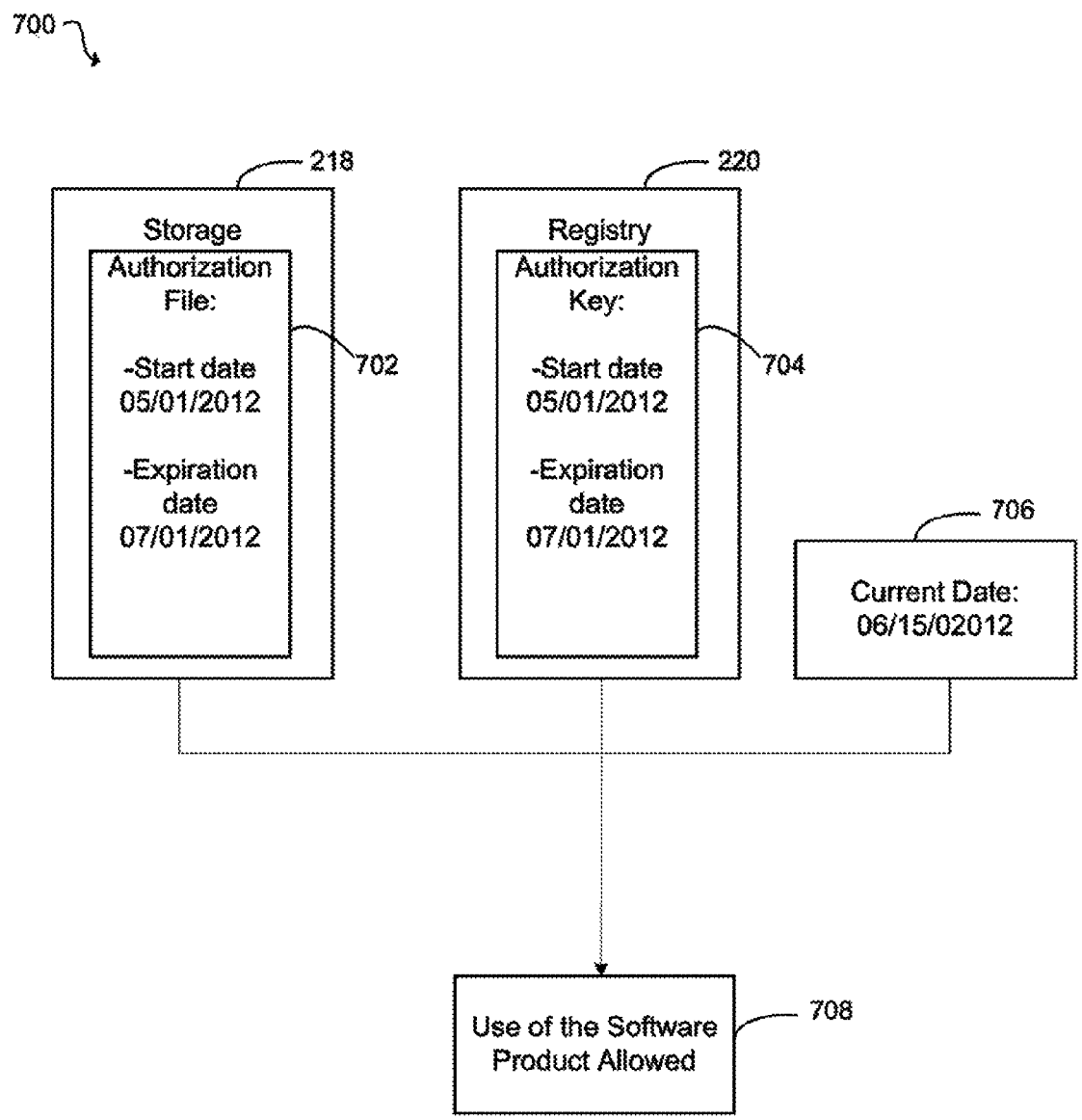
FIG. 7 is a block diagram illustrating one example of determining that use of a software product is authorized.

FIG. 7 is a block diagram illustrating one example 700 of determining that use of a software product is authorized. Example 700 shows the storage 218 with an authorization file 702 as one authorization item and the registry 220 with an authorization key 704 as another authorization item. Both the authorization file 702 and the authorization key 704 include the same start date and the same expiration date. The expiration date shown in both the authorization file 702 and the authorization key 704 is Jul. 1, 2012. As shown at 706, the current date when the software product is being run is Jun. 15, 2012, which is prior to the expiration date Jul. 1, 2012. As shown at 708, use of the software product is allowed.

Figure 8:
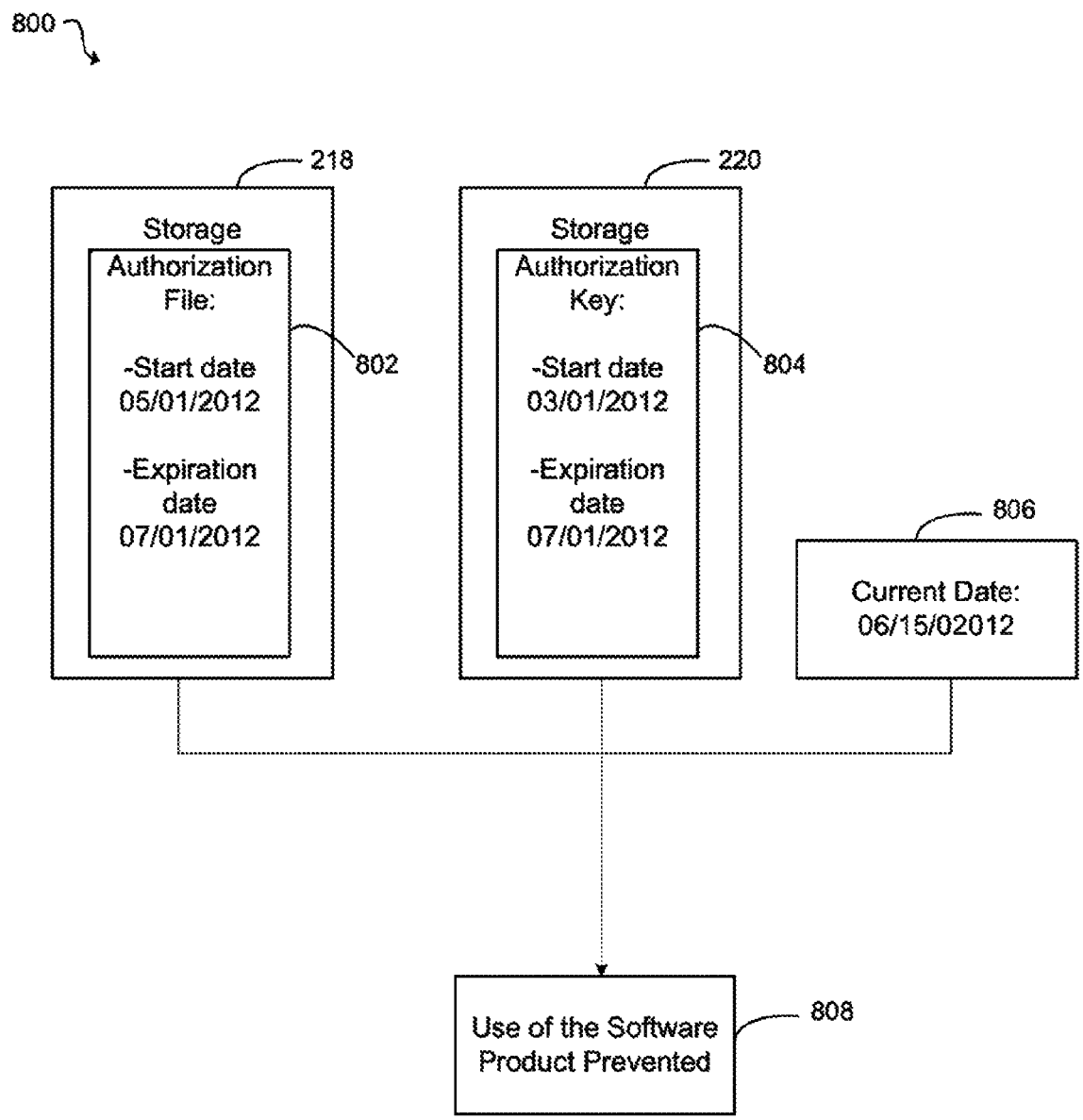
FIG. 8 is a block diagram illustrating one example of determining that use of a software product is unauthorized.

FIG. 8 is a block diagram illustrating one example 800 of determining that use of a software product is unauthorized. Example 800 includes an authorization file 802 in the storage 218 as one authorization item and an authorization key 804 in the registry 220 as another authorization item. The authorization file 802 and the authorization key 804 include different start dates and the same expiration date. The expiration date Jul. 1, 2012 shown in the authorization file 802 and the authorization key 804 is prior to the current date Jun. 15, 2012 when the software is being run shown at 806. However, because of the inconsistency between the start dates in the authorization file 802 and the authorization key 804, 808 shows that the use of the software product is unauthorized.

In some cases, an initial trial period may be set with an expiration date, but it may be desirable to extend the trim period. For example, a software vendor may receive a phone call from a client requesting that a trial period be extended. An extension key may be provided that extends the trial period, such as, for a number of days or until a particular date. The extension key may be evaluated and the expiration date in the first authorization item and the second authorization item may be updated based on the extension key.

Figure 9:
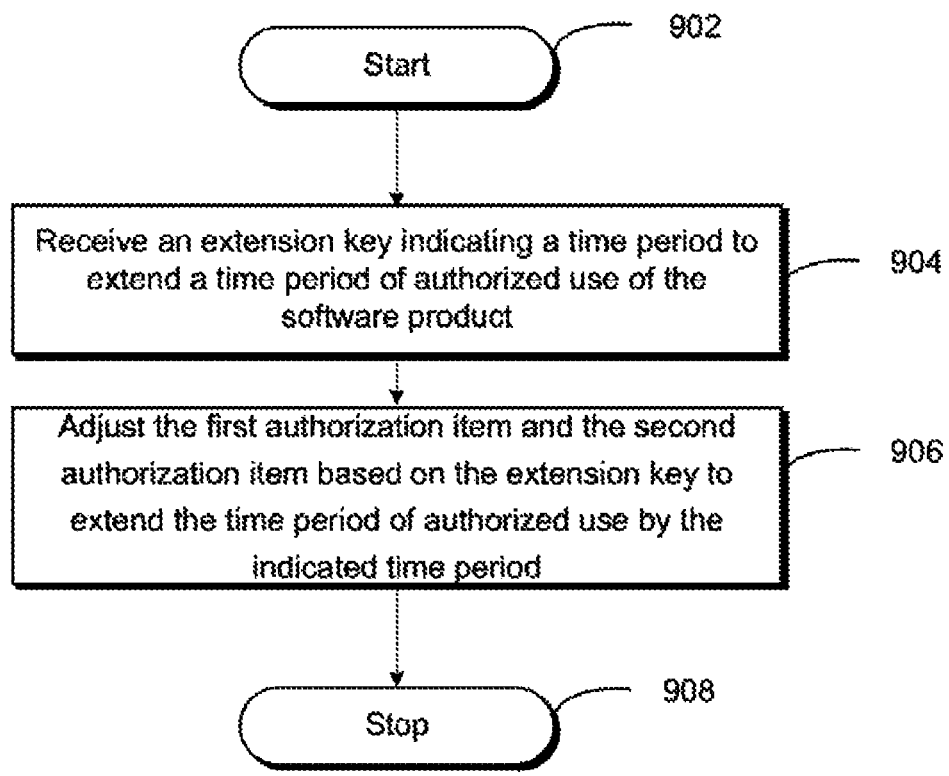
FIG. 9 is a flow chart illustrating one example of a method for extending the authorization period of a software product.

FIG. 9 is a flow chart illustrating one example of a method 900 to extend the authorization period of the software product 112. The processor 104 may receive an extension key. The extension key may be any suitable extension key, such as an extension key extending the date for a particular number of days or until a particular date. In one embodiment, a separate processor creates the extension key. For example, the extension key may be created and sent to a user or the processor 104 via a network.

In one embodiment, the extension key is a 20 digit key. For example, the extension key may be a key with digits sfee-eeee-eeod-dddd-dddc where s is a digit adjusted so that the key satisfies a check, such as a modulus 11 check, f is a digit set to 0 or 1 to indicate whether the trial should be reset, and c is a checksum value. The e digits may represent an expiration date for applying the key. The o digit indicates as number of weeks to extend the trial period. If o is set to 0, it may indicate that the trial period should be extended until the date represented by the d digits.

Beginning at 902 and moving to 904, the processor 104 receives an extension key indicating a time period to extend the time period of authorized use of the software product 112. The processor 104 may receive the extension key in any suitable manner, such as from user input to an input device communicating with the processor 104 or via a network. The extension key may update a trial period in any suitable manner. For example, the extension key may provide a specific date for the trial to end, indicate that the trial should be extended for a particular number of days, or restart the trial period. The key may extend the trial period by any suitable increment, such as by days, hours, or minutes. In some cases, the processor 104 may enforce rules related to the key. For example, the processor 104 may ensure that the original trial period is not extended to more than a year by adjusting the extension time downward if the extension time would otherwise extend the original trial period beyond a year.

Moving to 906, the processor 104 adjusts the first authorization item and the second authorization item based on the extension key to extend the period of authorized use by the indicated time period. For example, an expiration date written to the first authorization item and the second authorization item may be updated in both the first authorization item and the second authorization item. The method 900 continues to 908 and ends.

Figure 10:
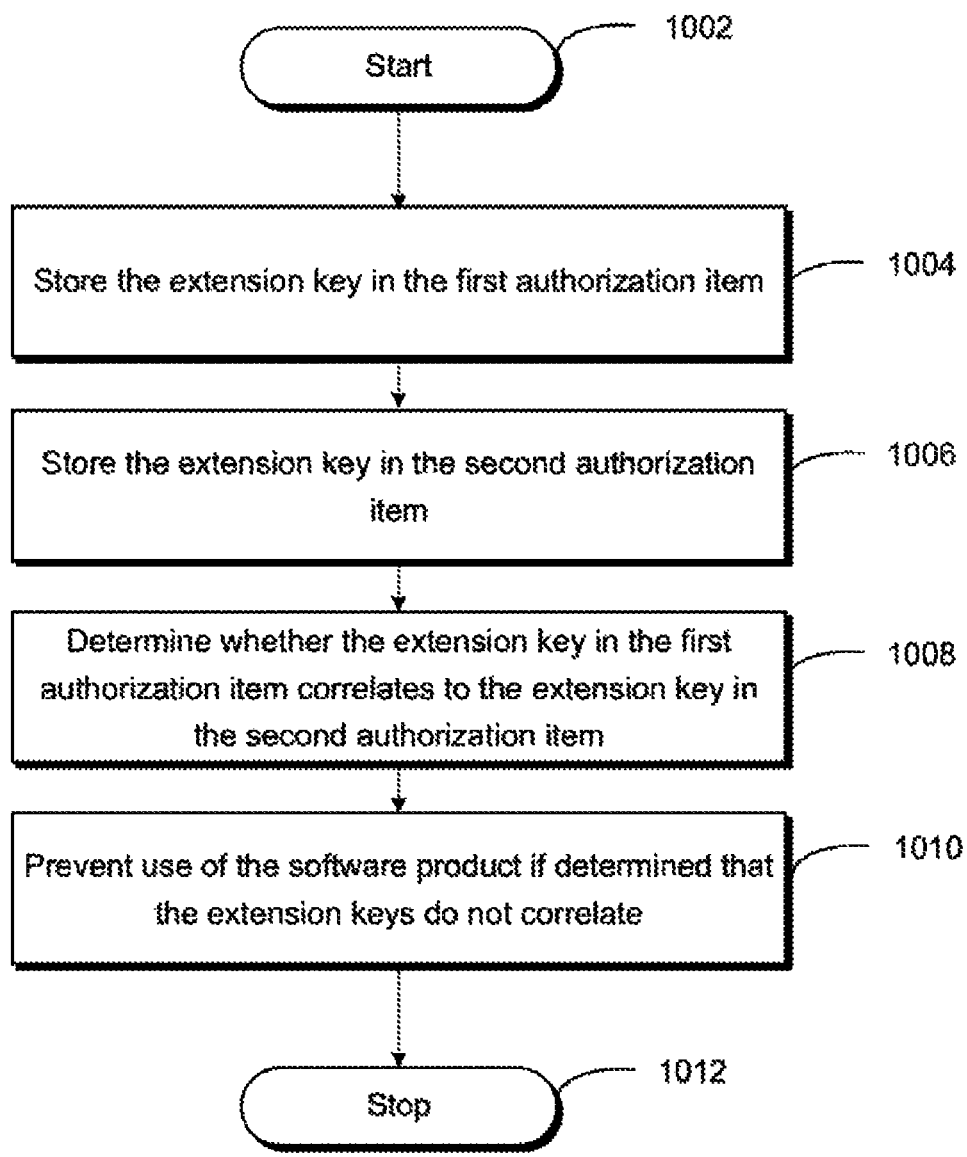
FIG. 10 is a flow chart illustrating one example of a method to extend the authorization period of a software product.

FIG. 10 is a flow chart illustrating one example of a method 1000 to extend the authorization period of a software product. For example, the processor 104 may store the extension key or a portion of the extension key in both the first authorization item and the second authorization item. The extension keys stored in the first authorization item and the second authorization item may be compared to determine whether the list of extension keys is the same. This may be done, for example, to prevent a user from reusing an extension key. A user may receive an extension key to extend the current trial period by thirty days, and it may be desirable to prevent the user from repeatedly using the key to keep extending the trial period by thirty days. The processor 104 may check the extension keys at any suitable time, such as each time the software product 112 is executed.

Beginning at 1002 and moving to 1004, the processor 104 stores the extension key in the first authorization item. The processor 104 may store additional information, such as the date the extension key was used. The processor 104 may store a portion of the extension key or the entire extension key.

Moving to 1006, the processor 104 stores the extension key in the second authorization item. Additional information related to the extension key may be stored in the second authorization item, and a portion of the key or the entire key may be stored.

Continuing to 1008, the processor 104 determines whether the extension key in the file correlates to the extension key in the registry key. For example, the processor 104 may determine if any extension keys found in the first authorization item are also in the second authorization time and vice versa. In some cases, the processor 104 may check whether the order of extension keys is the same in the first authorization item as in the second authorization item.

In one embodiment, the extension key includes information indicating the first authorization item and the second authorization item should be reset. For example, even if the two authorization items are inconsistent due to tampering, it may be desirable to fix the inconsistencies, such as for a valuable customer, so that the software product may be used. The processor 104 may, for example, update both a start date and an end date in both authorization items so that they are consistent. Its some cases, the processor 104 may adjust or delete information about previous extension keys so that the information is consistent between the first authorization item and the second authorization item.

Proceeding to 1010, the processor 104 prevents use of the software product 112 if determined that the extension keys do not correlate. This may be done, for example, because the trial period had been invalidly extended. If the extension keys do correlate, the processor 104 may determine whether use of the software product 112 is authorized based on the extended expiration date. The method 1000 continues to 1012 to end.

Figure 11:
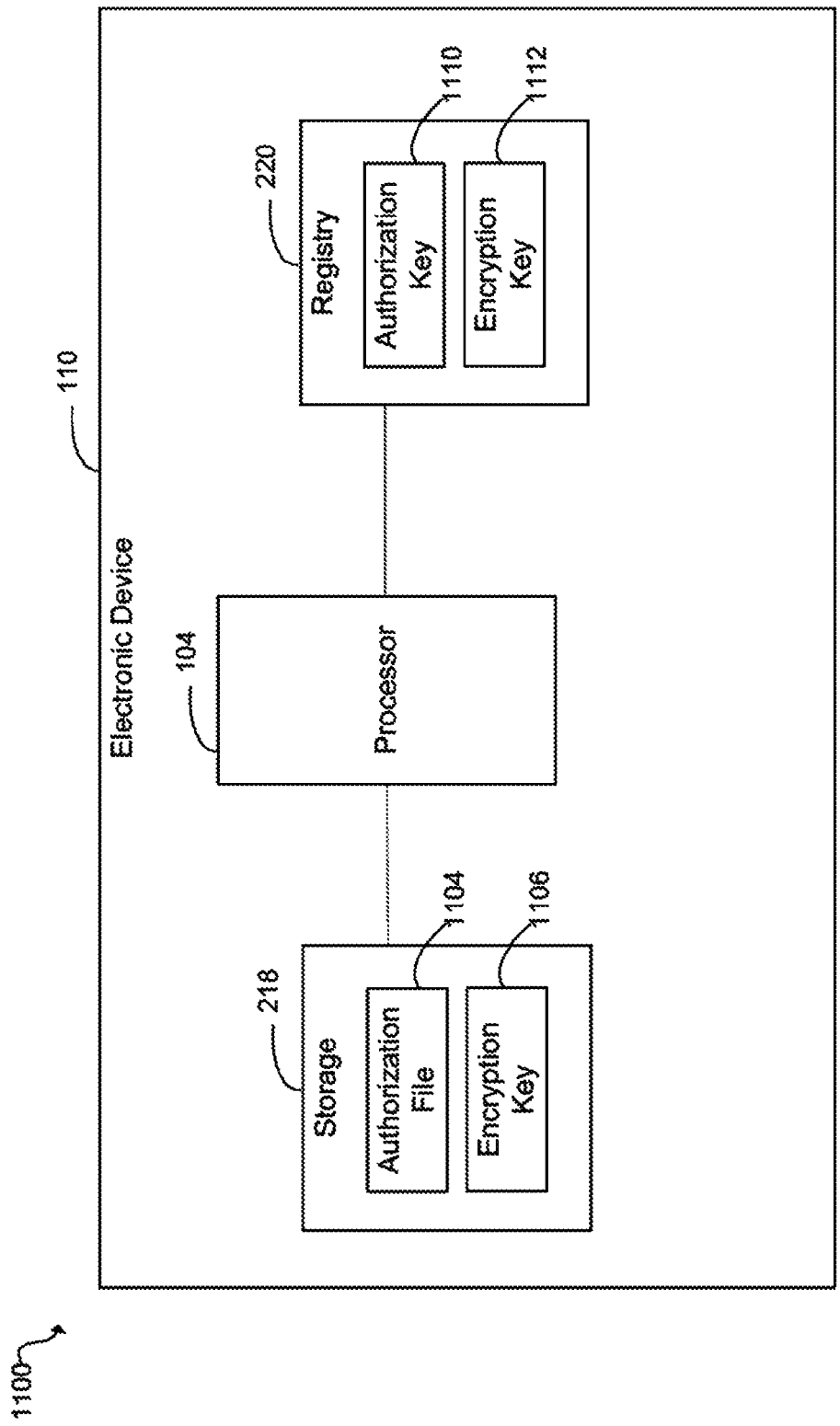
FIG. 11 is a block diagram illustrating one example of a computing system.

FIG. 11 is a block diagram illustrating one example of a computing system 1100. The computing system 1100 includes the processor 104, the storage 218, and the registry 220. The storage 218 includes an authorization file 1104 as a one authorization item, and the registry 220 includes an authorization key 1110 as another authorization item. The processor 104 may encrypt the authorization file 1104 using an encryption key 1106 and may encrypt the authorization key 1110 using an encryption key 1112. Using two separate encryption keys may make the system more secure because being able to decrypt one of the authorization file 1104 and the authorization key 1110 would not allow a user to decrypt the other. Because the two authorization items are analyzed to determine whether they match, updating one of the two authorization files would not allow a user to extend the use of the software product 112.

Determining whether use of a software product is authorized by comparing two authorization items created at separate times may make it more difficult for a user to detect where information about the authorization period is stored. As a result, a trial period for a software product may be more difficult to circumvent. A trial period may provide a valuable sales tool for a vendor to introduce a product to a potential customer for evaluation.

The invention claimed is:

1. A computing system comprising:
at least one hardware processor to:
create a first authorization item as part of installing a software product in the computing system;
create a second authorization item in response to execution of the software product in the computing system for the first time, wherein each authorization item of the first and second authorization items comprises a file stored in a storage or a registry key stored in a registry, wherein creating the second authorization item comprises:
determining whether the first authorization item indicates that the second authorization item should exist;
determining whether the second authorization item exists;
in response to determining that the second authorization item should not exist and determining that the second authorization item exists, preventing use of the software product; and
in response to determining that the second authorization item should not exist and determining that the second authorization item does not exist, creating the second authorization item;
determine whether use of the software product is authorized at a particular time based on a comparison of the first authorization item and the second authorization item; and
prevent use of the software product in response to determining that use of the software product is not authorized.

2. The computing system of claim 1, wherein the determining comprises:
in response to determining that the second authorization item does not exist and determining that the first authorization item indicates that the second authorization item was previously created, determining that use of the software product is not authorized.

3. The computing system of claim 1, wherein the at least one hardware processor is to further:
receive an extension key indicating a time period to extend a time period of authorized use of the software product; and
adjust the first authorization item and the second authorization item based on the extension key to extend the time period of authorized use by the indicated time period.

4. The computing system of claim 1, wherein the at least one hardware processor is to further:
encrypt the first authorization item with a first encryption key; and
encrypt the second authorization item with a second encryption key.

5. The computing system of claim 1, further comprising a non-transitory machine-readable storage medium storing instructions executable by the at least one hardware processor to cause the at least one hardware processor to perform the creating of the first authorization item, the creating of the second authorization item, the determining, and the preventing.

6. A method to determine authorization of a software product comprising:
creating, by an electronic device including a processor, a first authorization item as part of installing the software product in the electronic device;
determining, by the electronic device, whether the first authorization item indicates that a second authorization item should exist; and
determining, by the electronic device, whether the second authorization item exists;
in response to determining that the second authorization item should exist and determining that the second authorization item does not exist, preventing, by the electronic device, use of the software product;
creating, by the electronic device, the second authorization item in response to execution of the software product in the electronic device for the first time, wherein each authorization item of the first and second authorization items comprises a file or a registry key;
in response to determining that the second authorization item should not exist and determining that the second authorization item exists, preventing, by the electronic device, use of the software product;
determining, by the electronic device, whether use of the software product is authorized at a particular time based on a comparison of the first authorization item and the second authorization item; and
preventing, by the electronic device, use of the software product in response to the comparison indicating that the first authorization item is inconsistent with the second authorization item.

7. The method of claim 6, further comprising:
receiving, by the electronic device, an extension key indicating a time period to extend a time period of authorized use of the software product; and
adjusting, by the electronic device, the first authorization item and the second authorization item based on the extension key to extend the time period of authorized use by the indicated time period.

8. The method of claim 7, further comprising:
storing, by the electronic device, the extension key in the first authorization item;
storing, by the electronic device, the extension key in the second authorization item;
determining, by the electronic device, whether the extension key in the first authorization item correlates to the extension key in the second authorization item; and
preventing, by the electronic device, use of the software product in response to determining that the extension keys do not correlate.

9. The method of claim 6, further comprising:
encrypting, by the electronic device, the first authorization item with a first encryption key; and
encrypting, by the electronic device, the second authorization item with a second encryption key.

10. A non-transitory machine-readable storage medium storing instructions executable by a processor to:
generate a first authorization token as part of installing a software product in a system;
determine whether the first authorization token indicates that a second authorization token should exist;
determine whether the second authorization token exists;

in response to determining that the second authorization token should exist and determining that the second authorization token does not exist, prohibit use of the software product;

generate the second authorization token in response to execution of the software product for the first time in the system, wherein each authorization token of the first and second authorization tokens comprises a file or a registry key;

in response to determining that the second authorization token should not exist and determining that the second authorization token exists, prohibit use of the software product;

determine whether use of the software product is authorized at a particular time based on a comparison of the first authorization token and the second authorization token; and prohibit use of the software product in response to determining that use of the software product is not authorized.

11. The machine-readable storage medium of claim 10, further comprising instructions to:

receive an extension key indicating a time period to extend a time period of authorized use of the software product; and update the first authorization token and the second authorization token based on the extension key to extend the time period of authorized use by the indicated time period.

12. The machine-readable storage medium of claim 11, further comprising instructions to:

store the extension key in the first authorization token;

store the extension key in the second authorization token;

determine whether the extension key stored in the first authorization token correlates with the extension key stored in the second authorization token; and prohibit use of the software product in response to determining that the extension keys do not correlate.

13. The machine-readable storage medium of claim 10, further comprising instructions to:

encrypt the first authorization token with a first encryption key; and encrypt the second authorization token with a second encryption key.

14. The machine-readable storage medium of claim 10, wherein the comparison of the first authorization token and the second authorization token comprises comparing a first information element in the first authorization token with a second information element in the second authorization token to determine whether the first and second information elements match.

15. The machine-readable storage medium of claim 14, wherein the first information element comprises a date and time and the second information element comprises a date and time.

16. The machine-readable storage medium of claim 14, wherein the first information element being different from the second information element indicates tampering with at least one of the first and second authorization tokens.

17. The machine-readable storage medium of claim 10, further comprising instructions to:

as part of generating the second authorization token, retrieve information from the first authorization token to add to the second authorization token, wherein the comparison is of the information from the first authorization token with the information added to the second authorization token.

18. The machine-readable storage medium of claim 10, further comprising instructions to:

in response to generating the second authorization token, add information relating to a date of the execution of the software product for the first time to both the first and second authorization tokens.

* * * * *